(12) United States Patent
Demasters et al.

(10) Patent No.: US 10,846,992 B2
(45) Date of Patent: Nov. 24, 2020

(54) METHODS AND SYSTEMS FOR DELIVERING CLASS II GAMING

(71) Applicant: Class II Solutions, LLC, Dallas, TX (US)

(72) Inventors: Gregg Demasters, Sachse, TX (US); David Hampe, Plano, TX (US); Jeremy Tyra, Dallas, TX (US)

(73) Assignee: Class II Solutions, LLC, Dallas, TX (US)

( * ) Notice: Subject to any disclaimer, the term of this patent is extended or adjusted under 35 U.S.C. 154(b) by 75 days.

(21) Appl. No.: 16/520,206

(22) Filed: Jul. 23, 2019

(65) Prior Publication Data

US 2020/0027312 A1 Jan. 23, 2020

Related U.S. Application Data

(60) Provisional application No. 62/702,219, filed on Jul. 23, 2018.

(51) Int. Cl.
*G07F 17/32* (2006.01)
*G06F 9/54* (2006.01)

(52) U.S. Cl.
CPC ............ *G07F 17/3267* (2013.01); *G06F 9/54* (2013.01); *G07F 17/3223* (2013.01); *G07F 17/3227* (2013.01)

(58) Field of Classification Search
CPC ....................................................... G07F 17/32
See application file for complete search history.

(56) References Cited

U.S. PATENT DOCUMENTS

| | | | | |
|---|---|---|---|---|
| 5,709,603 A | * | 1/1998 | Kaye ........................ | G07F 17/32 463/17 |
| 2006/0111168 A1 | * | 5/2006 | Nguyen .................. | G07F 17/32 463/16 |
| 2007/0155473 A1 | * | 7/2007 | Powell ..................... | G07F 17/32 463/19 |
| 2008/0064501 A1 | * | 3/2008 | Patel ........................ | G07F 17/32 463/40 |

* cited by examiner

*Primary Examiner* — Omkar A Deodhar
(74) *Attorney, Agent, or Firm* — DuBois, Bryant & Campbell, LLP; William D. Wiese

(57) ABSTRACT

A gaming method and system for converting class III games to meet casino regulatory requirements for class II games through the use of a class II gaming engine. The random number generator used to determine results in any class III game is replaced with a class II gaming engine configured to provide bingo-generated game results in lieu of random number generated results while not altering the player's game play experience. Any class III gaming terminal may be communicatively connected to the class II gaming engine which, in turn, may be communicatively connected to a class II central server. The class II central server may be connected to a plurality of class II gaming engines in a plurality of casinos and may be used to manage and maintain the class II gaming engines.

18 Claims, 2 Drawing Sheets

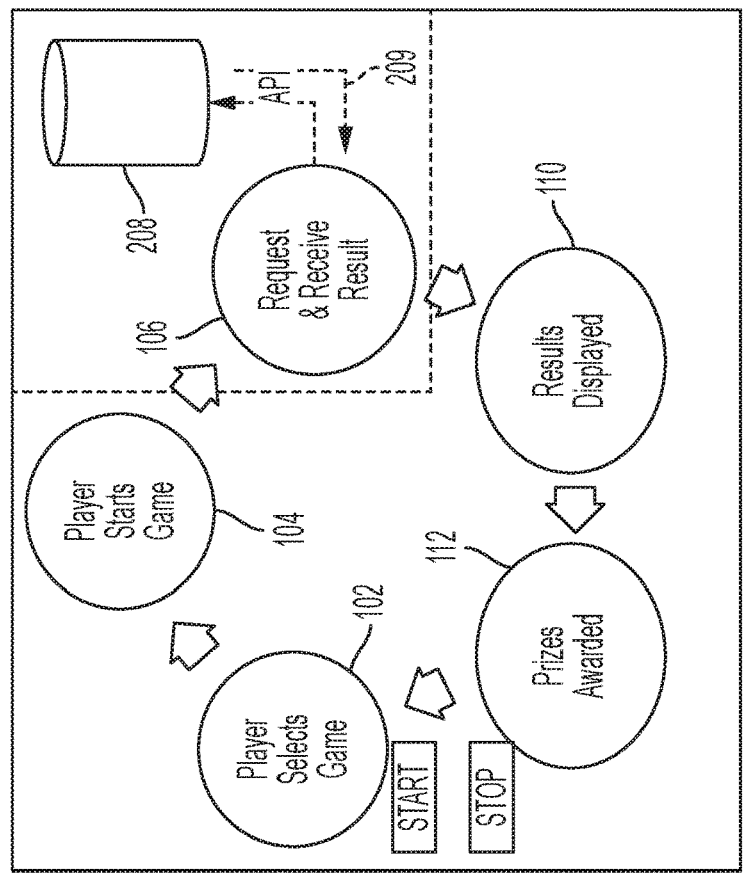
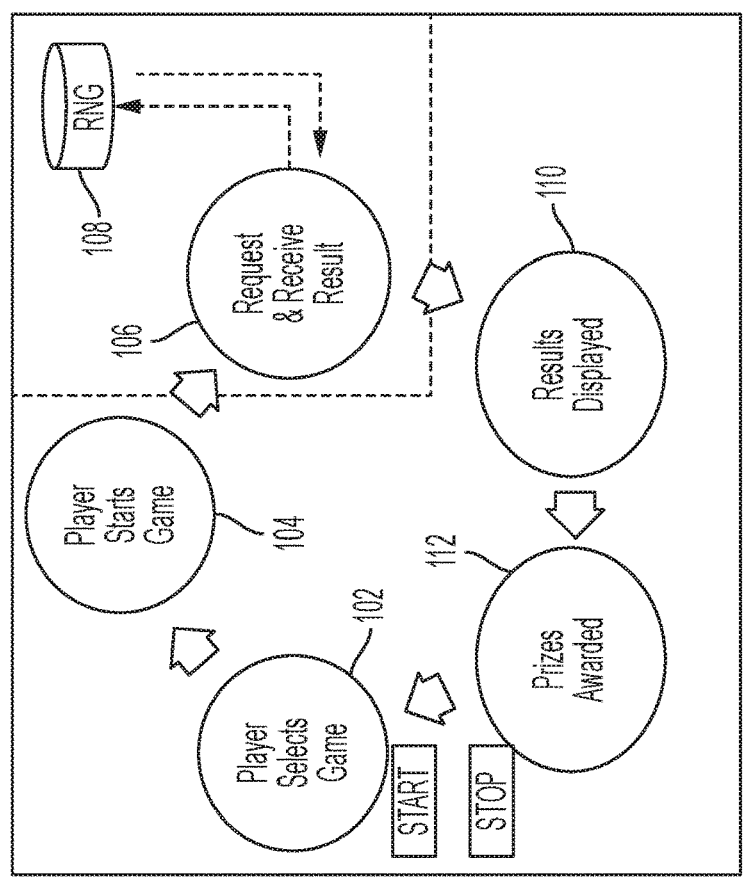

METHODS AND SYSTEMS FOR DELIVERING CLASS II GAMING

PRIORITY STATEMENT UNDER 35 U.S.C. § 119 & 37 C.F.R. § 1.78

This non-provisional application claims priority based upon prior U.S. Provisional Patent Application Ser. No. 62/702,219 filed Jul. 23, 2018, in the names of Gregg Demasters, David Hampe, and Jeremy Tyra entitled "METHODS AND SYSTEMS FOR DELIVERING CLASS II GAMING," the disclosures of which are incorporated herein in their entirety by reference as if fully set forth herein.

BACKGROUND OF THE INVENTION

The types of games that can be operated on tribal lands in the United States are regulated under the Indian Gaming Regulatory Act (IGRA). The IGRA divides games into three classes. Class I games are traditional Indian gaming, which may be part of tribal ceremonies and celebrations, and social gaming for minimal prizes.

Class II games are defined as a game of chance commonly known as bingo and, if played in the same location as a bingo game, pull tabs, punch board and other games similar to bingo. Class II gaming also includes non-banked card games, that is, games that are played exclusively against other players rather than against the house or a player acting as a bank.

Class III gaming is anything that doesn't fall under class I or class II. Simply put, class III gaming is traditional "Las Vegas" or "casino-style" gambling. Table games like roulette, blackjack and craps are all considered class III gaming, as would the random number generator-based slot machines and video poker games. Game terminals for class III games generally include software and/or hardware for generating random numbers to determine the class III game results.

As a general matter, class II gaming is self-regulated by the tribe and the National Indian Gaming Commission (NIGC) provides regulatory oversight and support according to the provision of the IGRA. The state where the tribal casino is located has no jurisdiction over class II gaming. In contrast, a state does have authority to regulate class III gaming pursuant to a contract negotiated with the tribe, known as a Tribal-State Compact. Importantly, the IGRA permits class II games to utilize "electronic, computer or other technologic aids."

There are several reasons why tribes in certain states have considerable incentive to operate more successful class II gaming in their casinos. The most significant factor in many cases is that the revenue generated by class II gaming is not typically included in revenue sharing with the state, while class III gaming revenue is included in any revenue sharing agreement pursuant to the applicable class III Tribal-State Compact. As the IGRA was enacted to promote and support tribal economic development, self-sufficiency, and strong tribal governments through the operation of gaming on Indian lands, more successful class II gaming in their casinos are needed to further that effort.

However, the creation of a robust class II gaming engine and the bingo math involved in creating regulatory compliant class II games is an intellectually difficult and time consuming project that hinders some casino game manufacturers from entering the class II market, delays others by years because of the development time involved, and causes others to actually supply less successful class II games or ultimately fail and cease such product offerings in the market.

There is a need, therefore, for a service that allows casino game manufacturers to enter the class II market in a short period of time, connecting new or already developed game terminals with a simple, one-time integration to a class II gaming engine that enables them to easily and readily deploy new, or convert existing, games to class II games by utilizing a robust class II gaming engine and the accuracy of class II bingo math designs to produce a player experience in the class II game that is nearly identical, or virtually indistinguishable, to that of the original game design.

SUMMARY OF THE INVENTION

Disclosed are systems and methods for developing new, or converting existing, class III games to meet regulatory requirements for class II games through the use of a class II gaming engine. Various embodiments of the invention provide a method of replacing the random number generator in an existing class III game terminals with a class II gaming engine, wherein the class II gaming engine provides bingo-generated game results in lieu of random number generated results, while not altering the player's game play experience.

In various implementations, class III games in a casino are communicatively coupled through a local area network to the class II gaming engine. The class II gaming engine uses distributions of pattern set solutions of a bingo game that replicate the distributions of states and prizes from a class III game design to replicate the player's experience on the class II game. Games that are modified for class II in this manner may be designed from newly-created class III games, existing class III games, or class III games that would be better suited for class II play.

To properly replicate a player's experience on a class II game, the class III game is partitioned into each of its separate states and statistics are collected throughout the game's play cycle, including the prizes (i.e., the universe of credit wins and state transitions). This information is paired against matching distributions of pattern set solutions to a bingo game, and those solutions are used to create bingo prize tables having the target credit wins and transitions for the class II game states, and their representative pattern sets.

The class II gaming engine may also be communicatively connected to a class II central server. This arrangement may be replicated through additional casinos with each being communicatively connected to the class II central server. The class II central server provides, among other things, remote support monitoring and troubleshooting tools, centralized reporting for each of the casinos, and if applicable centralized bingo game ball draws.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which:

FIG. 1 shows a schematic view of a flow diagram of a traditional random number generator-based game;

FIG. 2 shows a schematic view of a flow diagram of one embodiment of the flow of the game of the present invention.

Figure 3:
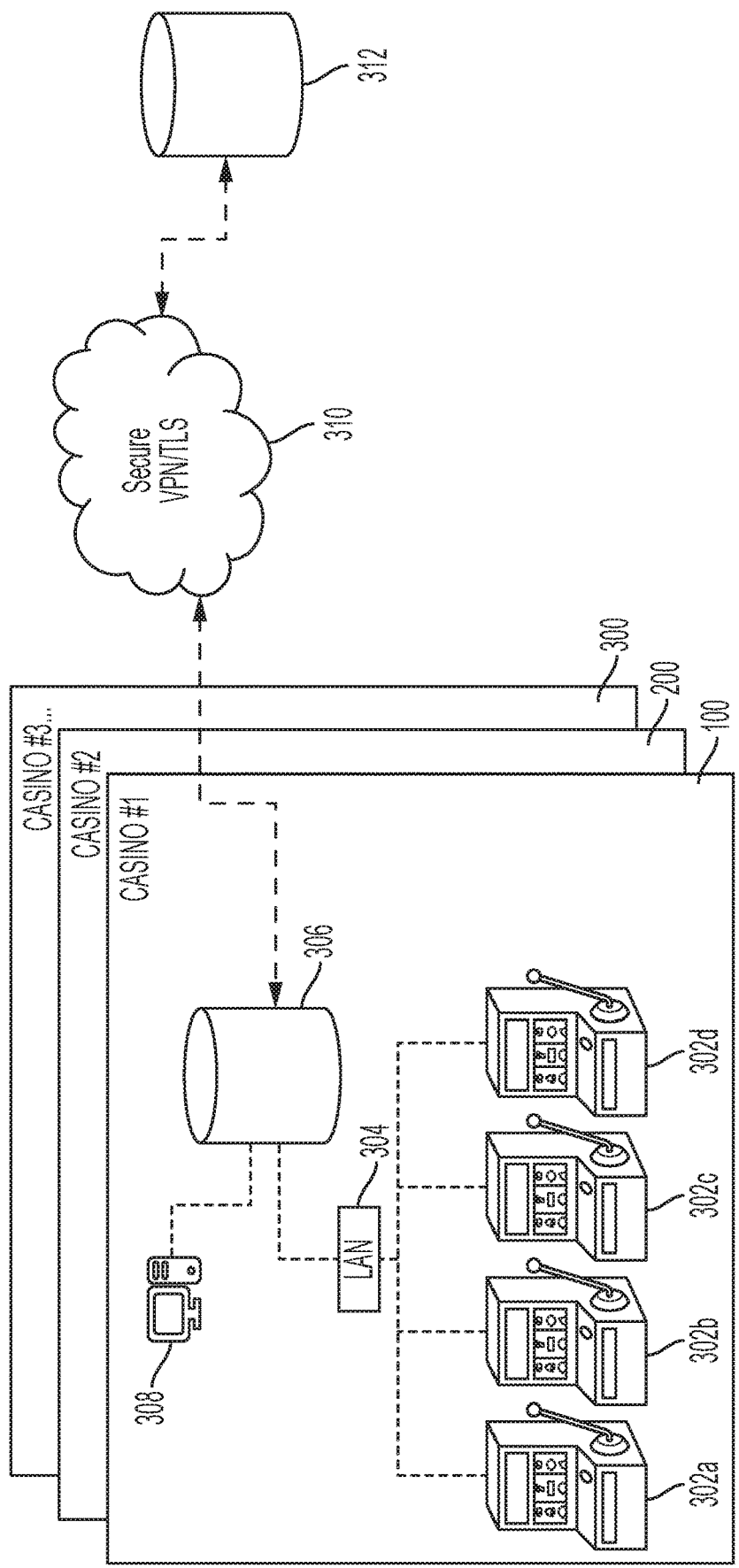
FIG. 3 shows one embodiment of the class II gaming system topology of the present invention.

Unless otherwise specifically noted, articles depicted in the drawings are not necessarily drawn to scale.

DESCRIPTION OF THE PREFERRED EMBODIMENTS

The present invention is directed to improved methods and systems for, among other things, delivering class II gaming. The configuration and use of the presently preferred embodiments are discussed in detail below. It should be appreciated, however, that the present invention provides many applicable inventive concepts that can be embodied in a wide variety of contexts other than those specifically described herein. Accordingly, the specific embodiments discussed are merely illustrative of specific ways to make and use the invention, and do not limit the scope of the invention. In addition, the following terms shall have the associated meaning when used herein:

"API" means application programming interface;

"bingo game" means the combination of all cards played by players actively participating in a common ball draw in order to determine secondary pattern and ending pattern prizes, as applicable per the rules and determined per the class II gaming engine;

"card" means the bingo card assigned to the player by the class II gaming engine for participation in a bingo game, in accordance with the rules;

"casino" means a Native American (Tribal) casino located in the U.S. authorized pursuant to applicable tribal, state, and/or federal regulations, or any other class II market;

"class II gaming" or "class II games" means the game of chance commonly known as bingo (whether or not electronic, computer, or other technologic aids are used in connection therewith) (I) which is played for prizes, including monetary prizes, with cards bearing numbers or other designations, (II) in which the holder of the card covers such numbers or designations when objects, similarly numbered or designated, are drawn or electronically determined, and (III) in which the game is won by the first person covering a previously designated arrangement of numbers or designations on such cards, including (if played in the same location) pull-tabs, lotto, punch boards, tip jars, instant bingo, and other games similar to bingo, and (ii) card games that (I) are explicitly authorized by the laws of the State, or (II) are not explicitly prohibited by the laws of the State and are played at any location in the State, but only if such card games are played in conformity with those laws and regulations (if any) of the State regarding hours or periods of operation of such card games or limitations on wagers or pot sizes in such card games; the term "class II gaming" does not include (i) any banking card games, including baccarat, chemin de fer, or blackjack (21), or (ii) electronic or electromechanical facsimiles of any game of chance or slot machines of any kind; and the terms used herein have the meanings set forth in 25 U.S.C. § 2703. Moreover, electronic or electromechanical facsimiles do not include the game of bingo "when the electronic or electromechanical format broadens participation by allowing multiple players to play with or against each other rather than with or against a machine" as defined in 25 C.F.R. § 502.8;

"class II gaming system" means all components, whether or not technologic aids in electronic, computer, mechanical, or other technologic form, that function together to aid the play of one or more Class II games, including but not limited to the class II gaming engine and the game terminal;

"ending pattern" means the predefined bingo patterns, per the rules, that once achieved by a player results in (i) the award of a predefined prize, and (ii) the end of a bingo game;

"game terminal" means any device, or electronic or electromechanical gaming machine, or platform, or player interface, or system used by a casino to provide game themes to players;

"game theme" means the graphical representations, or technological aids, derived from the game results and shown to the player on the game terminal. For a class II game, the specific game theme selected for game play by the player determines the rules applied by the class II gaming engine for each player participation in every bingo game;

"pattern set" means the secondary patterns and ending patterns that define a bingo game;

"player" means the patrons of a casino utilizing a game terminal to participate in a bingo game;

"prize" means the universe of credit wins and state transitions for each state played within a game;

"rules" means the complete description of the game's play cycle, and other defined rules for the player specific to a game theme. For a class II game, rules include the predefined bingo patterns, corresponding prizes, and other defined rules for the player specific to a game theme, and the player participation in subsequent bingo games, specific to a game theme.

"secondary pattern" means the predefined bingo patterns, per the rules, that once achieved by a player result in the award of a predefined prize, but NOT the end of a bingo game; and "state" means the various ways that a game can be played according to the game theme and rules (i.e. base game, bonus game, free spins, etc.). For a class II game, each state includes player participation in a bingo game.

Embodiments of the present invention are able to convert an existing class III game into a class II game while replicating the game play experience of the player and the earning potential for the casino. Moreover, embodiments of the present invention could be configured to make any existing, or newly developed, game terminal easily and readily capable of connecting to the class II gaming engine of the present invention for use as part of a class II gaming system.

Those skilled in the art will readily appreciate that the creation of a robust class II gaming engine and the replication of class III game results using class II bingo math design to create successful class II games and class II gaming systems is an intellectually challenging and time-consuming project. In fact, many casino game manufacturers may be delayed or entirely deterred from entering the class II market because of the complexities and the development time involved, and others have tried unsuccessfully or failed altogether because of such issues.

Embodiments of the present invention allow casino game manufacturers to enter the class II market in a short period of time with class II games that deliver the bingo math design accuracy required to produce the player experience and earning potential nearly identical, or indistinguishable, from that of the original game design targets. The manufacturer's original game design targets may be from newly created games, existing class III games, class II games that need a better bingo math design to better match the targeted player experience/earning potential, or any type of game where a probability of winning a certain prize is defined for the player. The manufacturer can integrate the class II gaming engine into a new or existing game terminal to easily and readily deploy a new game design as, or convert an existing game design to, a class II game and accurately replicating the original game design targets.

Embodiments of the invention include a robust class II gaming engine that handles the many ways that games can be played and an API that supports game play messages, accounting, network conditions, other errors that might occur on the casino game floor, and other relevant or required information. Multiple games and game terminals may be connected to one class II gaming engine. In addition, multiple game themes from a casino game manufacturer, and multiple manufacturers, may be connected to the same class II gaming engine.

Game terminals used to integrate with the class II gaming engine are not limited to traditional computer-based slot machine cabinets or legacy operating systems. For example, the game terminals can be traditional computer-based slot machine cabinets, kiosks, mobile devices, smart phones, network/internet devices, etc. The operating systems can be Windows, Linux, IOS, Android, UNIX, BSD, a derivative of any one of these or other publicly available operating systems. The game terminals can utilize development languages such as Flash, Java, C++, C #, HTML5, and many others. In fact, any platform and language capable of utilizing networking and implementing arbitrary transport and messaging protocols (TCP/IP, TLS, HTTP/2, protobuf, and gRPC specifically in this embodiment) are candidates for integration with embodiments of the class II gaming engine of the present invention.

As will be discussed in more detail below, relevant information is acquired from the manufacturer regarding the play of the game and expected results and that information is converted into a form appropriate for the class II gaming engine. Based on the information provided by the manufacturer, the class II gaming engine can generate, and make available through an API, a complete description of the game's play cycle, including the visual map data-set for providing visual aid results to the game terminal. In all cases the information regarding class II game play results, and any prizes, will be defined. For example, the class II gaming engine and the API handles transitions from the base game to bonus games, free spins, and other types of transitions such as player decisions. Transitions can take place from any game state to another and there is no limit to iterations (i.e. the class II gaming engine tracks game states and manages game transitions).

Referring now to FIG. 1, which shows a schematic view of a flow diagram of a traditional random number generator-based game. The process starts by a player selecting a game to be played 102. The player starts the game 104 and the game requests a result 106 from the random number generator 108. The random number generator 108 determines the result, which then establishes the prize, if any, to be awarded. Then the random number generator 108 returns the result to the game 106. The game then displays the result 110 and, if applicable, awards a prize 112 to the player.

Referring now to FIG. 2 which shows one embodiment of the present invention wherein the process again starts by a player selecting a game to be played 102. The player starts the game 104. However, in this case the game requests a result 106 from a class II gaming engine 208 and that class II gaming engine 208 broadens the participation in class II bingo games and allows multiple players to play with or against each other, rather than against the machine. The class II gaming engine 208 determines the prize to be awarded, if any, by class II bingo game play, which then establishes the result to be displayed to the player. Then the class II gaming engine 208 returns the result to the game 106. The game then displays the result 110 and, if applicable, awards a prize 112 to the player.

There are a variety of methods which may be utilized for returning a result to a game upon request. In the embodiment shown in FIG. 2, the game requests the result 106 through an API, although the same result could be achieved through a set of subroutines, protocols, tools or other methods of communication between the game and the class II gaming engine 208. In addition, information such as the layout of the bingo card, the pattern on the bingo card, the detail of any prizes, the visual displays of the results, stops and winnings on each line of a slot machine reel, whether they received a bonus game or a free spin, and similar information may also be provided through the API and made available for the player to view.

Referring now to FIG. 3, which shows the topology of a class II gaming system. Existing game terminal 302a, 302b, 302c, 302d in a casino 100 are electronically connected through a local area network 304 to a class II gaming engine 306. The class II gaming engine may be accessed, managed and maintained through a class II management terminal 308. The class II gaming engine may be communicatively connected to a class II central server 312, such as through a virtual private network or, for example, using a transport layer security (TLS) protocol 310. This arrangement may be replicated through additional casinos 200, 300 with each being communicatively connected to the class II central server 312. The class II central server 312 is centrally managed and provides, among other things, remote support monitoring and troubleshooting tools, and centralized reporting for each of the casinos 100, 200, 300. The class II central server may also include centralized bingo game ball draws and wide-area progressives.

To convert a class III game to a class II game using embodiments of the present invention, a blueprint showing the architecture of the class III game is first created. The class II game is partitioned into each of its separate states and transitions, if any. The states and their identifying properties are defined in a data set used by the class II gaming engine. Statistics are collected throughout the game play cycle of the class III game, including the prizes and state transitions. The state and prize distributions are then appropriately restructured or repartitioned to begin construction of a class II game that will replicate the class III game.

Those skilled in the art will appreciate that, in order to be class II-compliant, it is fundamental that the results generated by the class II gaming engine be derived from a bingo event. For example, if the odds of a particular credit win or transition occurring in the class III game are P, a bingo event having a probability of P would be used by the class II gaming engine to determine the occurrence of that credit win or transition. Subsets of the universe of bingo patterns are selected as a working basis for a search algorithm. Replicating a class III game, its rules, states, transitions, and credit win probabilities using bingo patterns and a class II gaming engine is a non-trivial task.

Returning to the above example, the class III prizes and distribution statistics are paired against matching distributions of pattern set solutions to a bingo game. Upon finding a solution that adequately replicates the class III game state using a bingo-game distribution, a bingo prize table with the targeted credit wins and transitions for the class II game state, and its representative pattern sets, is generated. In some embodiments, certain non-standard transitions (e.g., player-choice between different types of bonus game states to play next) might be identified within an auxiliary table. Visual layouts corresponding to the resultant prizes of a class III game state are also compiled to create a visual map data set for providing visual aid results to the game terminal (e.g. the reel stops of a slot machine game state or outcome displays of a bonus game state).

Another implementation of the present invention includes a method of converting class III games to class II games in which a series of states and prizes for a class III game is determined. The random number generator used to determine game play results is dissociated from the class III game and a class II gaming engine is communicatively connected to the class III game to create a class II game. The class II gaming engine generates bingo-game results that approximate the states and prizes of the class III game. Support is provided to the class II gaming engine through a class II central server communicatively connected thereto.

Another embodiment of the present invention is a game terminal configured from (i) a class III game having a random number generator which determines prizes, if any, within each state played, (ii) a class II gaming engine which generates bingo-game results that approximate the states and prizes of the class III game, and (iii) a class II central server communicatively connected to the class II gaming engine and configured to provide support to the class II gaming engine, wherein, the random number generator used to determine game play results is dissociated from the class III game to create a class II game and the class II gaming engine is communicatively connected to the class III game, thereby replicating a player's experience from the class III game on the class II game.

While the present system has been disclosed according to the preferred embodiment of the invention, those of ordinary skill in the art will understand that other embodiments have also been enabled. Although specific advantages have been enumerated above, various embodiments may include some, none, or all of the enumerated advantages. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of game terminals and class III games known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

To aid the Patent Office and any readers of any patent issued on this application in interpreting the claims appended hereto, the applicant wishes to note that it does not intend any of the appended claims or claim elements to invoke 35 U.S.C. 112(f) unless the words "means for" or "step for" are explicitly used in the particular claim.

We claim:
1. A game terminal, comprising:
a class III game terminal having a random number generator which determines prize distributions for each state of class III game themes operable with the class III game terminal;
a class II gaming engine configured to use pattern set evaluations for cards issued to players participating in bingo games to replicate prize distributions for each state of class III game themes;
wherein, the random number generator is dissociated from the class III game terminal, and the class II gaming engine is communicatively connected to the class III game terminal;
actual prize distributions are determined for each state of a class III game theme;
secondary pattern sets are created that replicate the actual prize distributions for each state of the class III game theme;
thereby creating a modified game terminal on which the secondary pattern sets and common ending pattern sets are used by the class II gaming engine to play a class II game that is communicated to the modified game terminal.

2. The game terminal of claim 1, wherein the class III game theme operable with the Class III game terminal is a slot machine.

3. The game terminal of claim 1, wherein the class II gaming engine is communicatively connected to the modified game terminal through an API.

4. The game terminal of claim 1, wherein the prize distributions include transitions from base game state to bonus or free spins game state, and back to base game state.

5. The game terminal of claim 1, wherein the prize distributions include transitions from a base game state to a bonus or free spin game state, a bonus or free spin game state to another bonus or free spin game state, and back to the base game state.

6. The game terminal of claim 1, wherein the modified game terminal is located in a casino.

7. The game terminal of claim 1, further having a class II central server communicatively connected to the class II gaming engine, wherein the class II central server provides support for the class II gaming engine.

8. The game terminal of claim 1, further having a class II central server communicatively connected to the class II gaming engine, wherein the class II central server also provides information regarding centralized bingo game ball draws to the class II gaming engine.

9. The game terminal of claim 1, further having a class II central server communicatively connected to the class II gaming engine, wherein the class II central server also provides information regarding wide area progressives to the class II gaming engine.

10. A method of converting a class III game terminal to play a class II game, comprising:

dissociating from a class III game terminal a random number generator used to determine prize distributions for each state of class III game themes operable with the class III game terminal, thereby creating a modified game terminal;

communicatively connecting the modified game terminal to a class II gaming engine, the class II gaming engine configured to use pattern set evaluations for cards issued to players participating in bingo games to replicate prize distributions for each state of class III game themes;

determining actual prize distributions for each state of a class III game theme;

creating secondary pattern sets that replicate the actual prize distributions for each state of the class III game theme, wherein the secondary pattern sets are used by the class II gaming engine to replicate play of the class III game theme; and generating, by the class II gaming engine, the secondary pattern sets and common ending pattern sets of a class II game that are communicated to the modified game terminal.

11. The method of converting a class III game terminal to play a class II game of claim 10, wherein the class III game theme operable with the class III game terminal is a slot machine.

12. The method of converting a class III game terminal to play a class II game of claim 10, wherein the class II gaming engine is communicatively connected to the modified game terminal through an API.

13. The method of converting a class III game terminal to play a class II game of claim 10, wherein the prize distributions include transitions from base game state to bonus or free spins game state, and back to base game state.

14. The method of converting a class III game terminal to play a class II game of claim 10, wherein the prize distributions include transitions from a base game state to a bonus or free spin game state, a bonus or free spin game state to another bonus or free spin game state, and back to the base game state.

15. The method of converting a class III game terminal to play a class II game of claim 10, wherein the modified game terminal is located in a casino.

16. The method of converting a class III game terminal to play a class II game of claim 10, further having a class II central server communicatively connected to the class II gaming engine, wherein the class II central server provides support for the class II gaming engine.

17. The method of converting a class III game terminal to play a class II game of claim 10, further having a class II central server communicatively connected to the class II gaming engine, wherein the class II central server also provides information regarding centralized bingo game ball draws to the class II gaming engine.

18. The method of converting a class III game terminal to play a class II game of claim 10, further having a class II central server communicatively connected to the class II gaming engine, wherein the class II central server also provides information regarding wide area progressives to the class II gaming engine.

* * * * *